United States Patent
Shoemaker et al.

(10) Patent No.: US 8,205,204 B2
(45) Date of Patent: *Jun. 19, 2012

(54) APPARATUS AND METHOD FOR SCHEDULING THREADS IN MULTI-THREADING PROCESSORS

(75) Inventors: Ken Shoemaker, Los Altos Hills, CA (US); Sailesh Kottapalli, Milpitas, CA (US); Kin-Kee Sit, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 418 days.

This patent is subject to a terminal disclaimer.

(21) Appl. No.: 12/359,113

(22) Filed: Jan. 23, 2009

(65) Prior Publication Data

US 2009/0144525 A1 Jun. 4, 2009

Related U.S. Application Data

(63) Continuation of application No. 10/047,809, filed on Jan. 15, 2002, now Pat. No. 7,500,240.

(51) Int. Cl.
*G06F 9/46* (2006.01)
*G06F 15/00* (2006.01)

(52) U.S. Cl. ............ 718/102; 712/9; 712/203; 712/206; 712/210

(58) Field of Classification Search ........................ None
See application file for complete search history.

(56) References Cited

U.S. PATENT DOCUMENTS

| 7,127,590 | B1 * | 10/2006 | Lindquist | 712/29 |
| 7,500,240 | B2 * | 3/2009 | Shoemaker et al. | 718/102 |
| 2008/0104375 | A1 * | 5/2008 | Hansen et al. | 712/220 |

* cited by examiner

*Primary Examiner* — Camquy Truong
(74) *Attorney, Agent, or Firm* — Kenyon & Kenyon LLP

(57) ABSTRACT

An multi-threading processor is provided. The multi-threading processor includes a first instruction fetch unit to receive a first thread and a second instruction fetch unit to receive a second thread. A multi-thread scheduler coupled to the instruction fetch units and a execution unit. The multi-thread scheduler determines the width of the execution unit and the execution unit executes the threads accordingly.

12 Claims, 4 Drawing Sheets

|   |     |     |     |     |     |     |
|---|-----|-----|-----|-----|-----|-----|
| A | 40  | 40  | 40  | 42  | 42  | 42  |
| B | 40  | 40  | 40  | 42  | 42  | 42  |
| C | 40  | 40  | 40  | 40  | 42  | 42  |
| D | 40  | 42  | 42  | 42  |     |     |
| E | 40  | 40  | 40  | 40  |     |     |
| F | 42  | 42  | 42  |     |     |     |
| G | 40  | 40  | 42  | 42  |     |     |

FIG. 4

APPARATUS AND METHOD FOR SCHEDULING THREADS IN MULTI-THREADING PROCESSORS

RELATED APPLICATIONS

This application is a continuation of patent application Ser. No. 10/047,809, now U.S. Pat. No. 7,500,240, filed on Jan. 15, 2002.

BACKGROUND OF THE INVENTION

1. Field of the Invention

The present invention relates generally to increasing utilization and overall performance in multi-threading microprocessors. More particularly, the present invention relates to more effectively scheduling threads to optimize a wide in-order processor.

2. Description of the Related Art

In a conventional computer system, microprocessors run several different processes. The computer system utilizes an operating system (OS) to direct the microprocessor to run each of the processes based on priority and on the process not waiting on an event (e.g., a disk access or a user keypress) to continue. The simplest type of priority system merely directs the OS to run the programs in sequence (i.e., the last program to be run has the lowest priority). In other systems, the priority of a program may be assigned based on other factors, such as the importance of the program, how efficient it is to run the program, or both. Through priority, the OS is then able to determine the order in which programs or software threads or contexts are executed by the processor. It takes a significant amount of time, typically more than the time required to execute several hundred instructions, for the OS to switch from one running process to another running process.

Because of the overhead incurred from each process switch, the OS will only switch out a process when it knows the process will not be ready to run again for a significant amount of time. However, with the increasing speed of processors, there are events, which make the process unexecutable for an amount of time that is not long enough to justify an OS-level process switch. When the program is stalled by such an event, such as a cache miss (e.g., when a long latency memory access is required), the processor experiences idle cycles for the duration of the stalling event, decreasing the overall system performance. Because newer and faster processors are always being developed, the number of idle cycles experienced by processors is also increasing. Although memory access speed is also being improved, it has not been increased at the same rate as microprocessor speeds, therefore, processors are spending an increasing percentage of time waiting for memory to respond.

Recent developments in processor design have allowed for multi-threading, where two or more distinct threads are able to make use of available processor resources. A Simultaneous Multi-Threading (SMT) microprocessor allows multiple threads to share and to compete for processor resources at the same time. The threads are scheduled concurrently and therefore operations from all of the threads progress down the pipeline simultaneously. If a thread in a SMT system is stalled and waiting for memory, the other threads will continue execution, thus allowing the SMT system to continue executing useful work during a cache miss.

Because multiple threads are able to issue instructions during each cycle, a SMT system typically results in a dramatic increase in system throughput. However, the performance improvement is subject to certain boundary conditions. The effectiveness of SMT decreases as the number of threads increases because the underlying machine resources are limited and because of the exponential cost increase of inspecting and tracking the status of each additional thread.

A major problem with scheduling threads in a SMT system occurs when developers attempt to build a SMT system with an in-order machine rather an out of order machine. As with any threads in any single threaded system, the instructions to be executed in a SMT system must be given an order of execution, determined by whether a particular instruction is dependent on another. For example, if a second instruction depends on a result from a first instruction, the processor must execute instruction one before executing instruction two.

An out of order machine includes built in hardware that determines whether or not instructions in a thread are dependent on the result of another instruction. If two threads are independent of each other, it is unnecessary to coordinate their scheduling of execution relative to each other. However, if an instruction is dependent upon another, then the out of order machine schedules the dependent instruction to be executed after the instruction from which it depends. After examining many instructions, the out of order machine is able to create chains of dependencies for the processor within its execution profile. Because the two threads are always independent in a SMT system, the existing hardware in the out of order machine may be extended to schedule the threads to execute in parallel.

An in-order machine does not include hardware to determine instruction dependency. Instead, instructions are simply presented in memory in the same order that the compiler or program places them. Therefore, the instructions must be executed in the same exact order that they were placed into memory. Because in-order machines cannot determine the dependency of each instruction, an in-order machine is not able to properly reorder instructions from different threads in a SMT system. An additional in-order scheduling problem arises when the processor is not wide enough and does not have the bandwidth to execute the multiple threads in parallel.

While SMT systems are able to process more than two threads simultaneously (some developers have tried to schedule as many as eight threads at a time), each additional thread requires an increase in machine cost. For example, a large parallel logic array (PLA) may be required to coordinate and schedule all of the threads if a SMT system is complex enough. Therefore, it is often not an efficient use of processing power to execute more than two threads at the same time. Furthermore, such additional overhead is often completely unwarranted because few machines are wide enough or have the resources to support more than two active threads.

In view of the foregoing, it is desirable to have a method and apparatus that provides for a system able to maximize the use of wide processor resources in an in-order machine. In particular, it is desirable to have an in-order SMT system because they are simpler than out of order machines, thereby conserving valuable chip space, consuming less power, and generating less heat. It is also desirable to have an in-order SMT system with minimal circuit impact.

BRIEF DESCRIPTION OF THE DRAWINGS

The present invention will be readily understood by the following detailed description in conjunction with the accompanying drawings. To facilitate this description, like reference numerals designate like structural elements.

FIG. 4 illustrates two threads being executed in the bandwidth of an in-order multi-threading processor in accordance with one embodiment of the present invention.

DETAILED DESCRIPTION

A method and apparatus for a multi-threading computer system to efficiently schedule threads in a wide in-order processor is provided. In the following description, numerous specific details are set forth in-order to provide a thorough understanding of the present invention. It will be understood, however, to one skilled in the art, that the present invention may be practiced without some or all of these specific details. In other instances, well known process operations have not been described in detail in-order not to unnecessarily obscure the present invention.

In general, to improve the performance of a microprocessor, the number of transistors that must fit onto a single chip die must be increased. Therefore, the spatial constraint of a single semiconductor chip is perhaps the greatest limiting factor in the speed of a microprocessor and other forms of chips. Developers and engineers constantly strive to find novel means to fit more transistors onto a chip die. For example, the advent of 0.13 micron semiconductor design and fabrication is specifically intended to form smaller patterns and features in a chip. The technology would then allow even more transistors and other circuitry to be placed within the spatial constraint of a single chip.

Overcoming the spatial limitations of a semiconductor chip will only become more and more important in future generations of processors, therefore research is always ongoing to deal with spatial limitations of the future. Processor designs that conserve and efficiently utilize space on a chip will become more and more advantageous over processor designs that do not. Therefore, the greatest advantage of an in-order machine over an out of order machine is simplicity of design. Because an out of order machine is much more complex, it requires a much larger number of transistors and much more space.

For example, in the Intel processor family, the Pentium processor is an in-order machine with approximately three million transistors. By comparison, the Pentium Pro, which is an out of order machine, uses about six and a half million transistors, requiring much more space than the in-order Pentium. Because of the additional transistors, the Pentium Pro also requires more power and generates more heat. The present invention takes advantage of the existing space conserving design of the in-order machine, which is used in Intel's Itanium Processor Family (IPF) by enabling the in-order platform to support a multi-threading processor.

Figure 1:
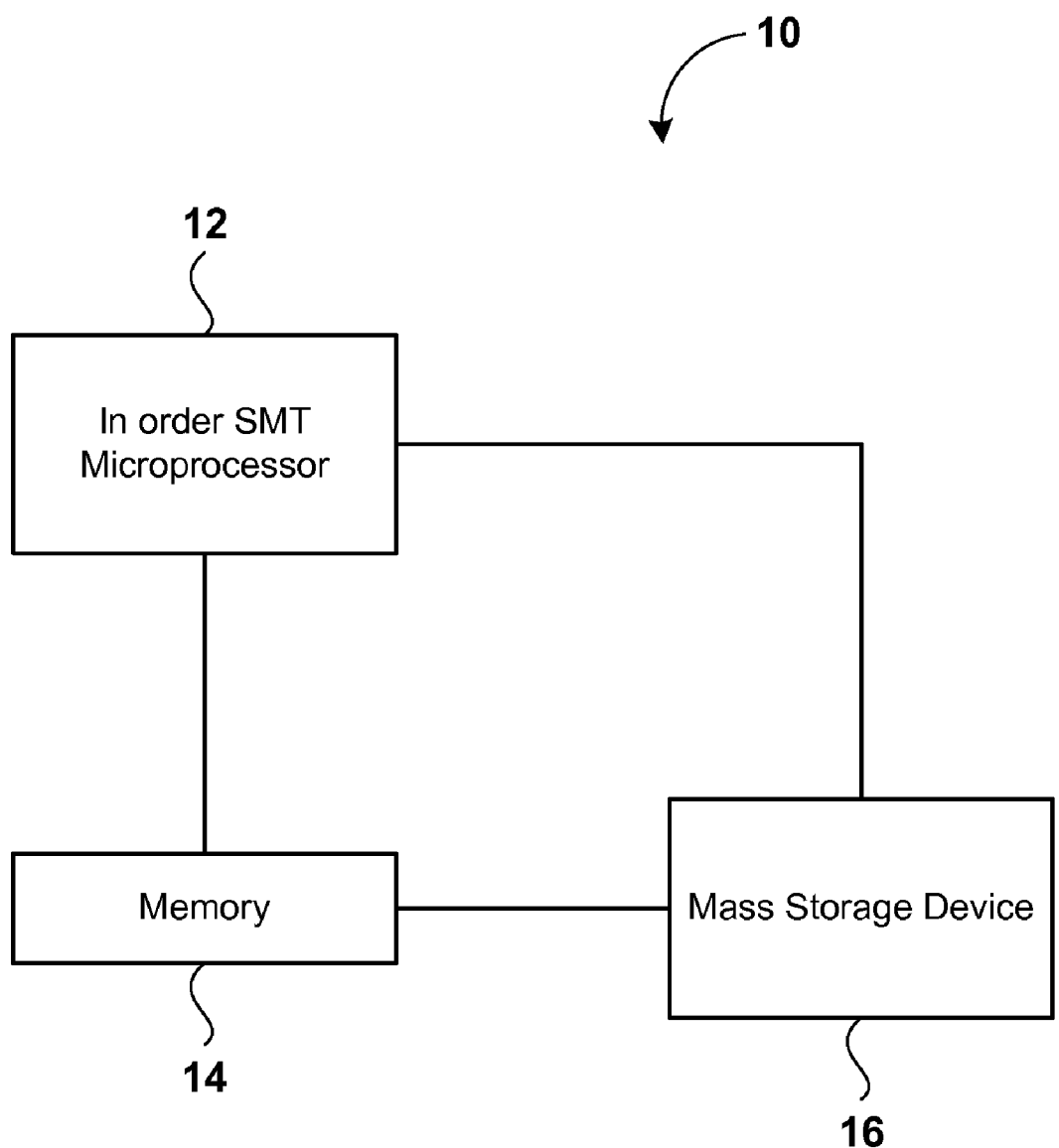
FIG. 1 illustrates a multithreading system in accordance with one embodiment of the present invention.

FIG. 1 is an illustration of a multi-threading computer system 10 in accordance with one embodiment of the present invention. Multi-threading computer system 10 includes an in-order multi-threading processor 12 that is coupled to a memory module 14 and a mass storage device 15. In-order multi-threading processor 12 is preferably a SMT processor. Memory module 14 is typically a form of random access memory (RAM), such as synchronous dynamic RAM (SDRAM) or Rambus Dynamic RAM (RDRAM). Examples of mass storage device 15 include hard disk drives, floppy drives, optical drives, and tape drives. In multi-threading system 10, programs are loaded from mass storage device 15 into memory module 14 and then executed by in-order multi-threading processor 12.

In-order multi-threading processor 12 must execute instructions in the order the instructions were entered into memory module 14. Therefore, unlike an out of order processor, in-order multi-threading processor 12 is unable to create independent chains of execution necessary to extract instruction level parallelism (ILP) from a single thread. To determine the dependencies of each of the instructions from the multiple threads, multi-threading computer system 10 relies on a specialized multi-thread scheduler and a compiler to identify sets of independent instructions and logic to schedule the threads.

Figure 2:
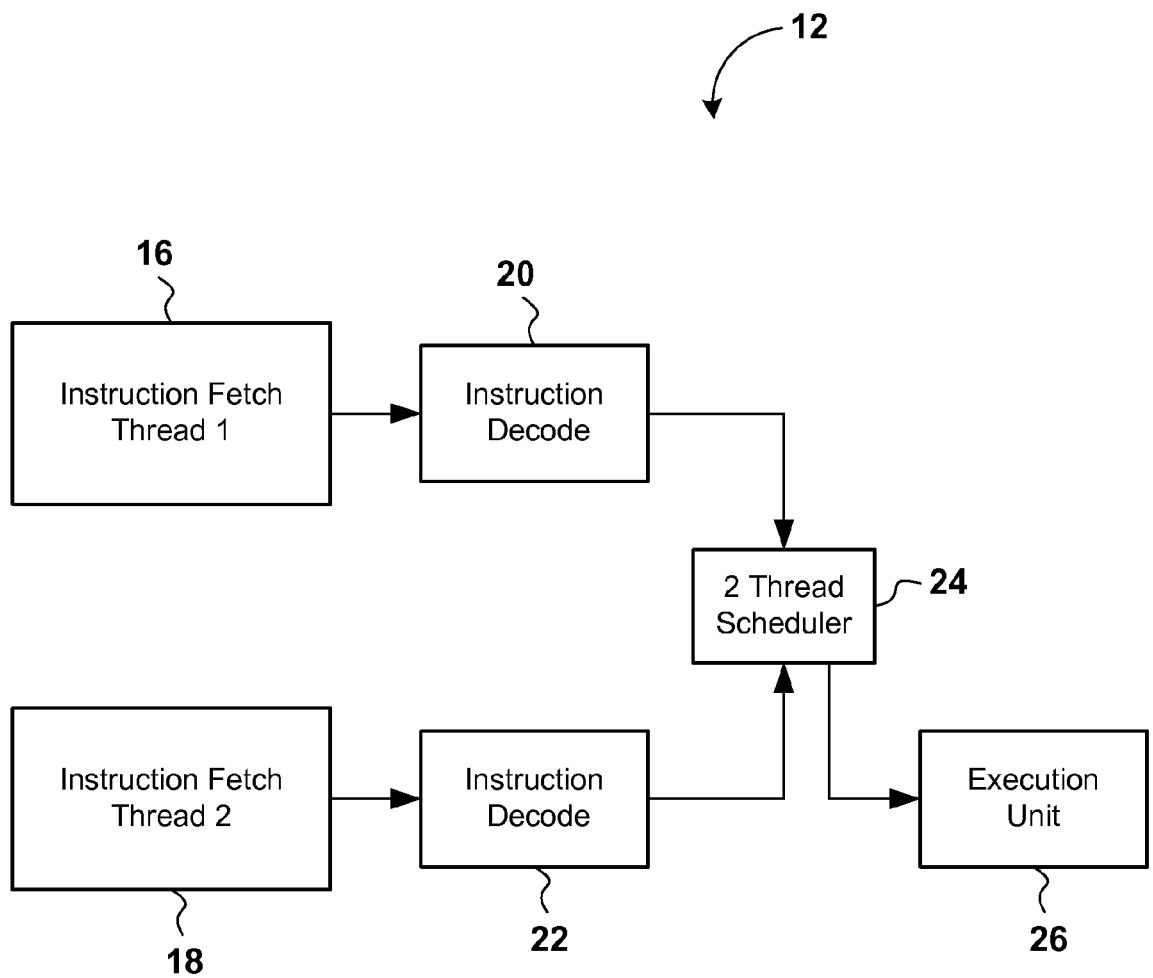
FIG. 2 illustrates the in-order multi-threading processor in accordance with one embodiment of the present invention.

FIG. 2 illustrates in-order multi-threading processor 12 in accordance with one embodiment of the present invention. In-order multi-threading processor 12 includes a pair of instruction fetch units 16 and 18 for thread 1 and thread 2, respectively. Each of the instruction fetch units (IFU) 16 and 18 are uni-directionally coupled to corresponding instruction decode units (IDU) 20 and 22 for threads 1 and 2. IDUs 20 and 22 are then coupled to a multi-thread scheduler 24. In-order multi-threading processor 14 also includes an execution unit 26, which is coupled to multi-thread scheduler 24.

IFUs 16 and 18 read instructions from memory (such as an instruction cache) for threads 1 and 2. Each IFU functions to ensure that the processor has enough instruction bandwidth to sustain the highest possible instruction issue rate. IFUs also operate to predict future instruction sequences with a high degree of accuracy. The instructions are then transmitted to IDUs 20 and 22, which perform operations such as register renaming and initial dependency checks. IDUs also function to predict branch paths and compute target addresses for branch instructions.

Instructions from IDU 20 and 22 are then transmitted to multi-thread scheduler 24. Multi-thread scheduler 24 takes into account the available local capacity and prioritizes the incoming instructions from both thread 1 and thread 2, with the goal of maximizing processor utilization. Multi-thread scheduler 24 therefore determines whether or not execution unit 26 is wide enough to execute thread 1 and thread 2 at the same time and subsequently decides whether to execute the threads in parallel or in series. Other examples of scheduling policies may include scheduling high load/store processes and low load/store processes together to yield better system utilization and performance.

Typically, a programmer writes the program in a language such as Pascal, C++ or Java, which is stored in a file called the source code. The programmer then runs the appropriate language compiler to convert the source code into object code. The object code comprises machine language that the processor can execute one instruction at a time. In addition to generating object code, a compiler may support many other features to aid the programmer. Such features may include automatic allocation of variables, arbitrary arithmetic expressions, variable scope, input/output operations, higher-order functions and portability of source code.

In the present invention, the compiler explicitly describes blocks of independent operations to the in-order machine so that may be executed in parallel. In contrast, a compiler for earlier machines was not capable of describing independent instructions. Instead, hardware was required to determine independent instructions at run time. Therefore, in the present invention, the task of generating instruction level parallelism is accomplished statically at compile time rather than dynamically at run time.

This thread dispersal of the compiler of the present invention for in-order machines thus motivates the development of wide in-order machines that can execute many instructions simultaneously. In addition, to efficiently utilize the capabilities of a wide in-order machine, the machine must also be able to schedule multiple threads when the compiler cannot find enough ILP in a single thread to fully occupy the machine as described above with regard to multi-thread scheduler 24.

Figure 3:
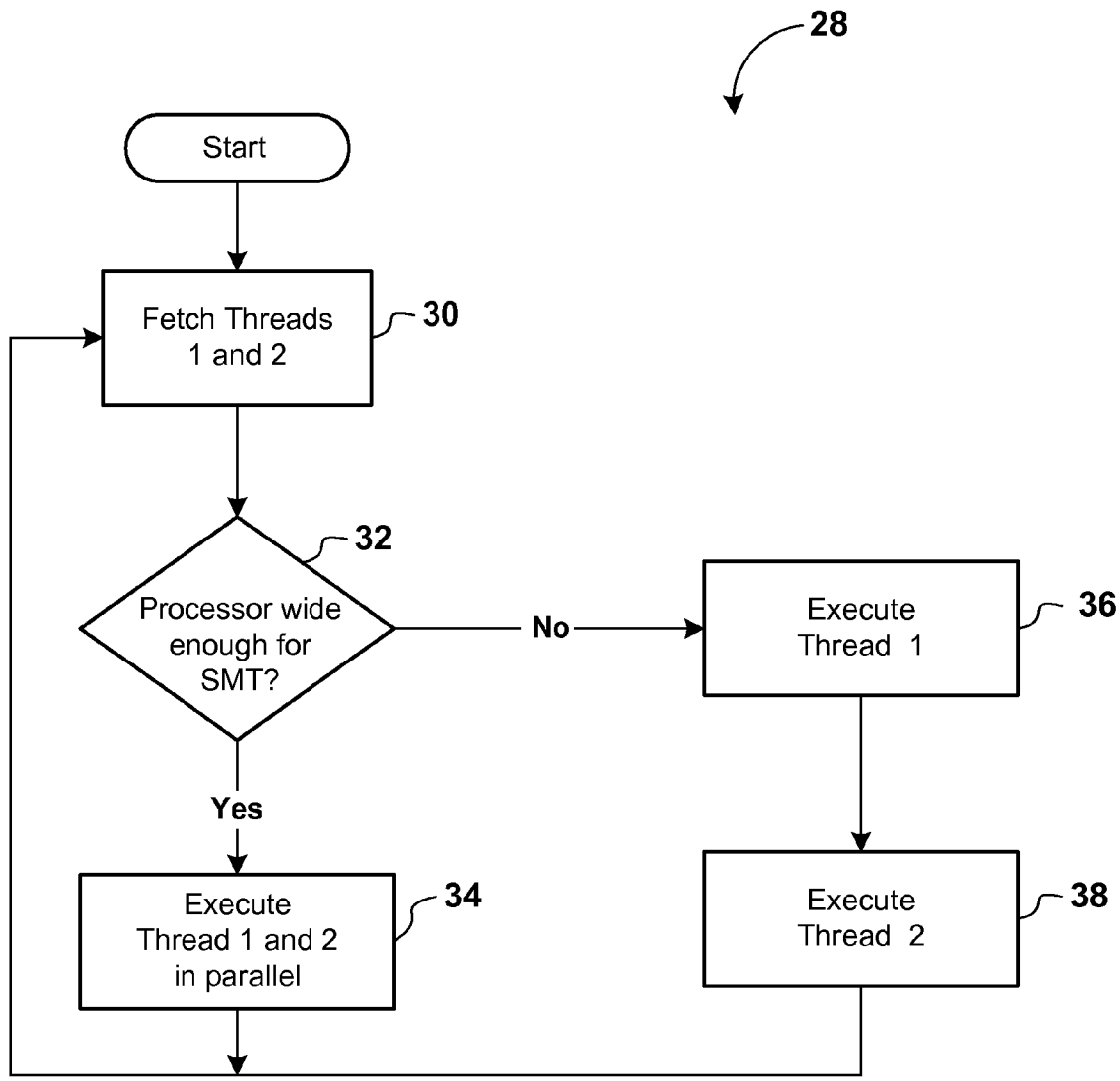
FIG. 3 is a flow chart of a method for scheduling threads for an in-order multi-threading processor in accordance with one embodiment of the present invention.

FIG. 3 is a flow chart of a method 28 for scheduling threads for an in-order multi-threading processor in accordance with one embodiment of the present invention. Method 28 begins at a block 30 where thread 1 and thread 2 are fetched. A block 32 determines whether the in-order multi-threading processor is wide enough to execute both threads 1 and 2 in parallel. The width of threads 1 and 2 are examined during each cycle and then compared to the width of the processor. If the in-order multi-threading processor is wide enough to execute all of the instructions in threads 1 and 2, then both threads 1 and 2 are executed in parallel in a block 34. If the in-order multi-threading processor is not wide enough to execute both threads, then the threads are executed in series in blocks 36 and 38.

FIG. 4 illustrates two threads being executed in the bandwidth of an in-order multi-threading processor in accordance with one embodiment of the present invention. As shown, an in-order multi-threading processor usually has enough width to execute threads 1 and 2 in parallel. This is because the compiler can usually find instructions from one thread that are only use half of the machine. The individual instructions in threads 1 and 2 are called syllables 40 and 42, which are organized cycle by cycle based on whether a particular syllable 40 is dependent upon the result of another. Using method 28 as described above, the threads are analyzed to determine if syllables 40 from thread 1 and syllables 42 from thread 2 fit in the width of the in-order multi-threading processor. If the syllables from both threads cannot be executed in parallel, then each thread must be executed in series.

Referring to FIG. 4, lines A, B, C, D, and G illustrate examples of an in-order multi-threading processor executing threads 1 and 2 in parallel. However, in line E, thread 1 included four syllables 40 and thread 2 included three syllables 42, proving to be too wide for the in-order multi-threading processor. The syllables 42 for thread 2 were then deferred until the next cycle represented by line F. Then in line G, the in-order multi-threading processor was again wide enough to execute both threads 1 and 2, therefore parallel operations resumed.

While multi-thread scheduler 24 in FIG. 2 is programmed to schedule only two threads for processing, it is well known in the art that a multi-thread scheduler may be configured to schedule additional threads. Each additional thread being scheduled by in-order multi-threading processor 12 would also require a corresponding instruction fetch and instruction decode unit. While such a system would be able to process more than two threads simultaneously, each additional thread requires an exponential increase in machine cost, such as a large parallel logic array (PLA), to coordinate and schedule all of the threads.

Therefore, adding additional threads to the present invention could eliminate the advantage of multi-threading. In fact, the per-thread cost is even larger for an in-order machine than for an out-of-order machine. With the current configuration of in-order multi-threading processor 12, it is not an efficient use of processing power to execute more than two threads at the same time, particularly because the processor is not currently wide enough to support more than two threads in parallel.

In summary, the present invention provides for an apparatus and method for scheduling multiple threads for a simultaneous multi-threading in-order processor. Despite the fact that out of order dynamic machines have the advantage of possessing an existing structure to schedule threads and create independent chains of execution in a multi-threading processor, in-order static machines possess many desirable architectural characteristics, such as simplicity of design. In-order machines are also easier to design than out of order machines because in-order machines are less complex.

Another advantage of an in-order machine is the conservation of space and power. Although out of order machines offer additional features in return for the additional design effort, the complexity of the architecture is a disadvantage because it requires much more of the limited space on a semiconductor chip. As microprocessor speeds continue to increase, the number of transistors that must fit into a semiconductor chip die must also increase, a process that could lead to overheating. The present invention therefore not only provides for utilizing an in-order machine for multi-threading processes, but also for conserving power and chip space, allowing much more flexibility for future microprocessor designs.

Other embodiments of the invention will be appreciated by those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. An apparatus comprising:
a multi-threading processor including:
an instruction fetch unit to receive a first thread and a second thread fetched from memory;
an execution unit to execute said first thread and said second thread;
a multi-thread scheduler coupled to said execution unit, wherein said multi-thread scheduler is to determine the width of said execution unit; and
an instruction decode unit coupled between the instruction fetch unit and the multi-thread scheduler, wherein said decode unit is to decode said first thread and said second thread;
wherein the width of the first thread and the second thread are examined during each cycle and then the combined width of the first and second thread is compared to the width of the execution unit;
wherein said execution unit is to execute said first thread and said second thread in parallel if said execution unit is wide enough and to execute said first thread and said second thread in series if said execution unit is not wide enough.

2. A multi-threading processor device as recited in claim 1, wherein the multi-thread processor is an in-order processor.

3. A multi-threading processor device as recited in claim 2, wherein the first thread and the second thread are compiled to have instruction level parallelism.

4. A multi-threading processor device as recited in claim 2, wherein the execution unit executes only two threads in parallel.

5. A method for scheduling threads in a multi-threading processor, comprising:
fetching a first thread and a second thread from a memory;
decoding the first thread and the second thread;
examining the width of the first thread and the second thread;
comparing the combined width of the first thread and the second thread to the width of an execution unit;

determining whether said execution unit is wide enough to execute said first thread and said second thread in parallel;

executing said first thread and said second thread in parallel if said execution unit is wide enough to execute the first thread and the second thread in parallel; and executing said first thread and said second thread in series if said execution unit is not wide enough.

6. A method for scheduling threads as recited in claim 5, wherein the multi-threading processor is an in-order processor.

7. A method for scheduling threads as recited in claim 6, further comprising compiling the first thread and the second thread, wherein the first thread and the second thread have instruction level parallelism.

8. A method for scheduling threads as recited in claim 7, wherein the multi-threading processor executes only two threads in parallel.

9. A set of instructions residing in a non-transitory storage medium, said set of instructions capable of being executed by a processor for performing a method of searching data stored in a mass storage device, the method comprising:

fetching a first thread and a second thread from a memory;

decoding the first thread and the second thread;

examining the width of the first thread and the second thread;

comparing the combined width of the first thread and the second thread to the width of an execution unit;

determining whether said execution unit is wide enough to execute said first thread and said second thread in parallel;

executing said first thread and said second thread in parallel if said execution unit is wide enough to execute the first thread and the second thread in parallel; and executing said first thread and said second thread in series if said execution unit is not wide enough.

10. A method as recited in claim 9, wherein the multi-threading processor is an in-order processor.

11. A method as recited in claim 10, further comprising compiling the first thread and the second thread, wherein the first thread and the second thread have instruction level parallelism.

12. A method as recited in claim 11, wherein the multi-threading processor executes only two threads in parallel.

* * * * *